(12) United States Patent
Tokuhara et al.

(10) Patent No.: US 12,441,150 B2
(45) Date of Patent: Oct. 14, 2025

(54) DAMPING FORCE VARIABLE SHOCK ABSORBER

(71) Applicant: Hitachi Astemo, Ltd., Hitachinaka (JP)

(72) Inventors: Masato Tokuhara, Hitachinaka (JP); Akira Nishimoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/858,617

(22) PCT Filed: Apr. 22, 2022

(86) PCT No.: PCT/JP2022/018616
§ 371 (c)(1),
(2) Date: Oct. 21, 2024

(87) PCT Pub. No.: WO2023/203773
PCT Pub. Date: Oct. 26, 2023

(65) Prior Publication Data
US 2025/0269695 A1    Aug. 28, 2025

(51) Int. Cl.
*B60G 17/015*    (2006.01)
*B60G 15/06*    (2006.01)
(Continued)

(52) U.S. Cl.
CPC ....... *B60G 17/0165* (2013.01); *B60G 15/062* (2013.01); *B60G 17/0152* (2013.01);
(Continued)

(58) Field of Classification Search
CPC .............. B60G 17/0165; B60G 15/062; B60G 17/0152; B60G 2202/312; B60G 2204/62;
(Continued)

(56) References Cited

U.S. PATENT DOCUMENTS

| 5,013,062 A * | 5/1991 | Yonekawa | B60G 17/016 |
| | | | 280/5.503 |
| 7,722,056 B2 * | 5/2010 | Inoue | B60G 17/06 |
| | | | 280/6.154 |

(Continued)

FOREIGN PATENT DOCUMENTS

| JP | 07031418 U | 6/1995 |
| JP | 2006321260 A | 11/2006 |

(Continued)

OTHER PUBLICATIONS

International Search Report mailed Jun. 21, 2022 for the corresponding International Patent Application No. PCT/JP2022/018616 (7 pages including English translation).

*Primary Examiner* — Toan C To
(74) *Attorney, Agent, or Firm* — Leason Ellis LLP; Edward J. Ellis; Melvin C. Garner

(57) ABSTRACT

A damping force variable shock absorber includes a damping force variable mechanism including a damping force generator, a damping force variable actuator, and a damping force controller which controls an operation of the damping force variable actuator, and a vehicle height control mechanism including a self-pumping mechanism configured to, using a vibration caused by traveling of a vehicle as a driving force, pressurize a hydraulic oil and push a spring, a vehicle height variable actuator which switches a flow path of the hydraulic oil pressurize by self-pumping, and a vehicle height controller which controls an operation of the vehicle height variable actuator. The damping force controller performs a damping force variable control in which a damping force in a pushing process of the spring while a vehicle height is increasing is set to be weaker than a damping force during a period in which the vehicle height is not increasing.

5 Claims, 15 Drawing Sheets

(51) Int. Cl.
*B60G 17/0165* (2006.01)
*B62K 25/28* (2006.01)
*B62K 25/04* (2006.01)

(52) U.S. Cl.
CPC ...... *B62K 25/283* (2013.01); *B60G 2202/312* (2013.01); *B60G 2204/62* (2013.01); *B60G 2300/12* (2013.01); *B60G 2400/202* (2013.01); *B60G 2400/204* (2013.01); *B60G 2500/104* (2013.01); *B60G 2500/30* (2013.01); *B60G 2600/182* (2013.01); *B60G 2800/162* (2013.01); *B60G 2800/914* (2013.01); *B60G 2800/916* (2013.01); *B62K 2025/044* (2013.01); *B62K 2025/045* (2013.01)

(58) Field of Classification Search
CPC .......... B60G 2300/12; B60G 2400/202; B60G 2400/204; B60G 2500/104; B60G 2500/30; B60G 2600/182; B60G 2800/162; B60G 2800/914; B60G 2800/916; B62K 25/283; B62K 2025/044; B62K 2025/045
See application file for complete search history.

(56) References Cited

U.S. PATENT DOCUMENTS

| | | | | |
|---|---|---|---|---|
| 8,888,107 | B2* | 11/2014 | Murakami | B60G 17/021 |
| | | | | 280/6.157 |
| 9,180,746 | B2* | 11/2015 | Kasuga | B60G 17/015 |
| 10,328,764 | B2* | 6/2019 | Murakami | B62K 25/283 |
| 11,833,877 | B2* | 12/2023 | Schmidt | F16F 9/08 |
| 2006/0142916 | A1* | 6/2006 | Onuma | B60G 21/067 |
| | | | | 280/5.506 |
| 2014/0088829 | A1* | 3/2014 | Kasuga | B60G 17/015 |
| | | | | 701/37 |
| 2017/0305226 | A1* | 10/2017 | Okimura | B60G 17/033 |
| 2024/0227488 | A1* | 7/2024 | Mochizuki | B60G 17/0565 |
| 2024/0300275 | A1* | 9/2024 | Anderson | H02K 7/14 |

FOREIGN PATENT DOCUMENTS

| | | |
|---|---|---|
| JP | 2007245956 A | 9/2007 |
| WO | 2021044552 A1 | 3/2021 |

* cited by examiner

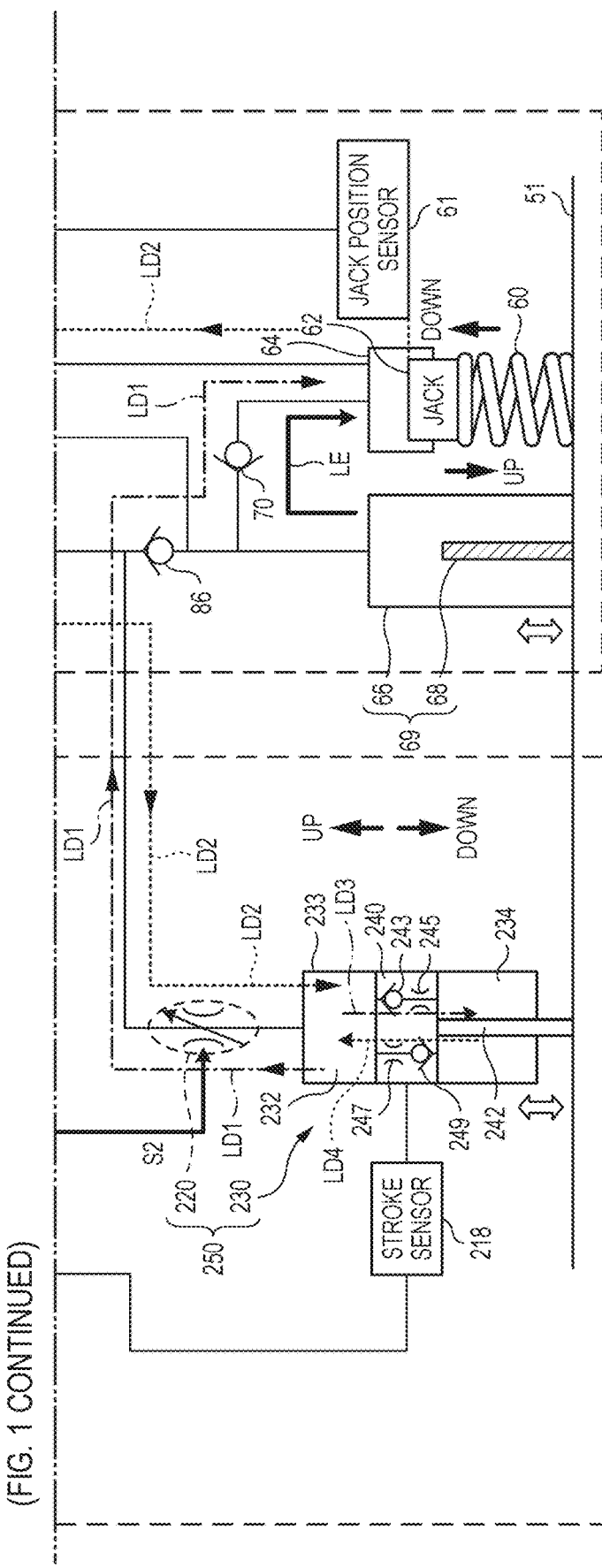
(FIG. 1 CONTINUED)

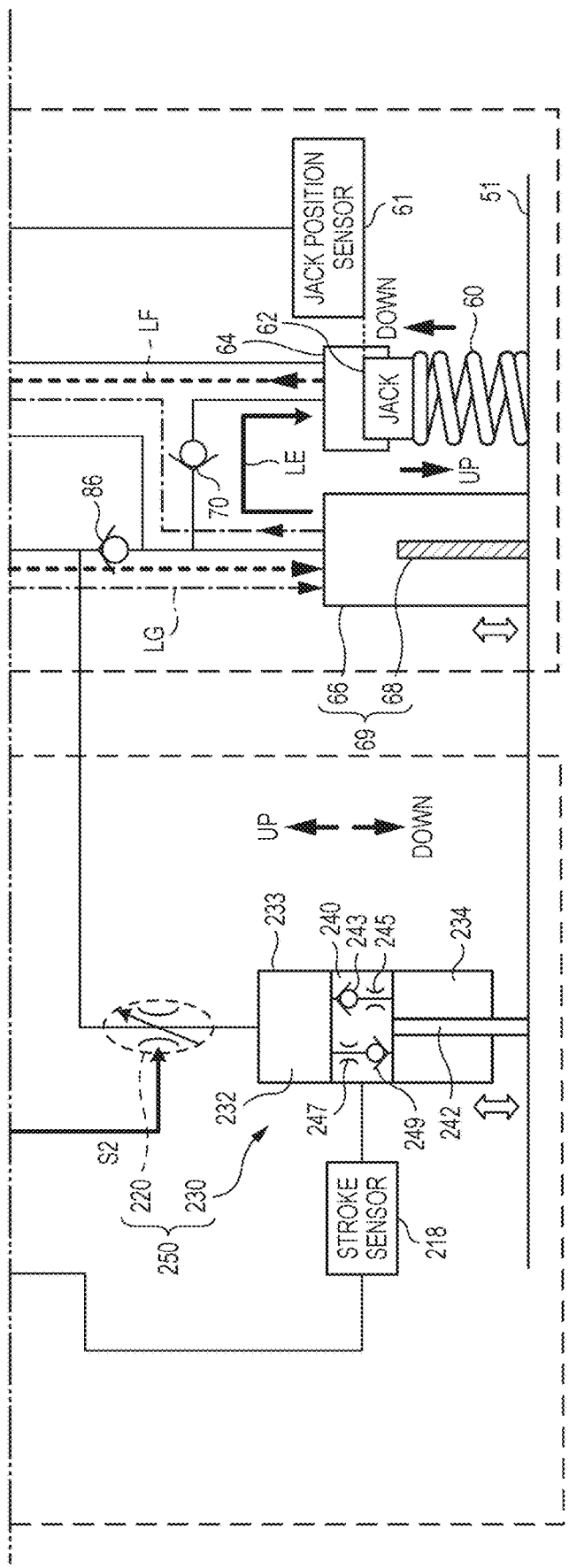

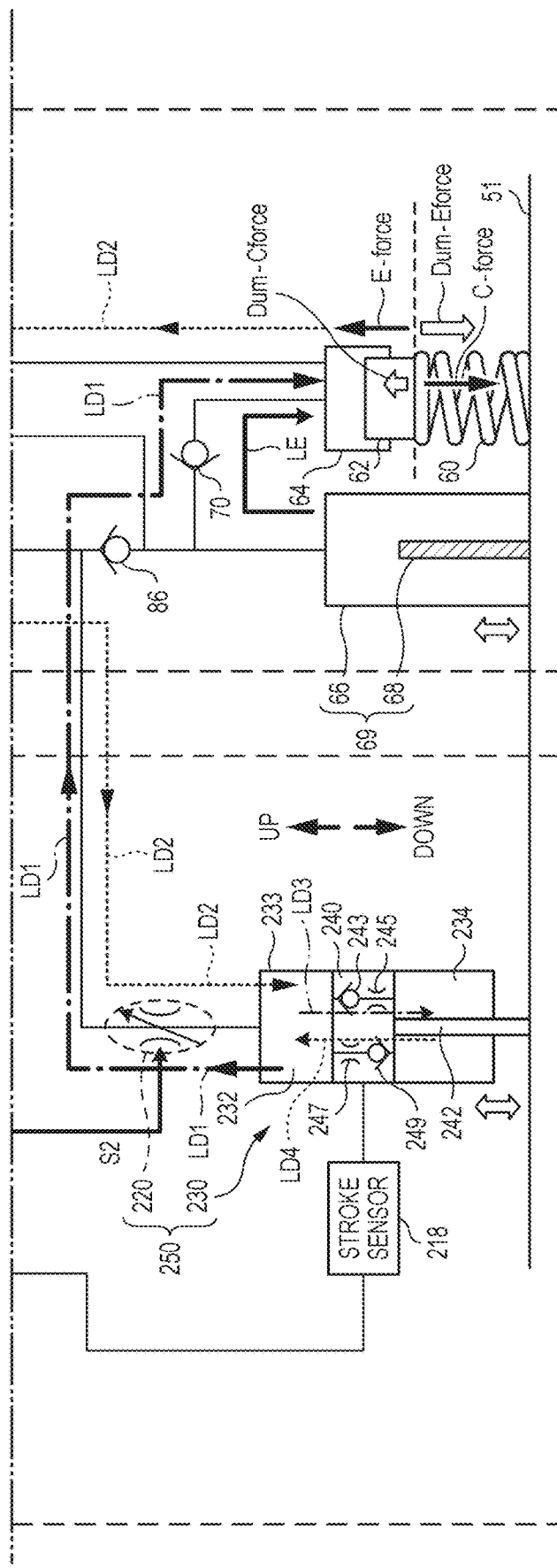

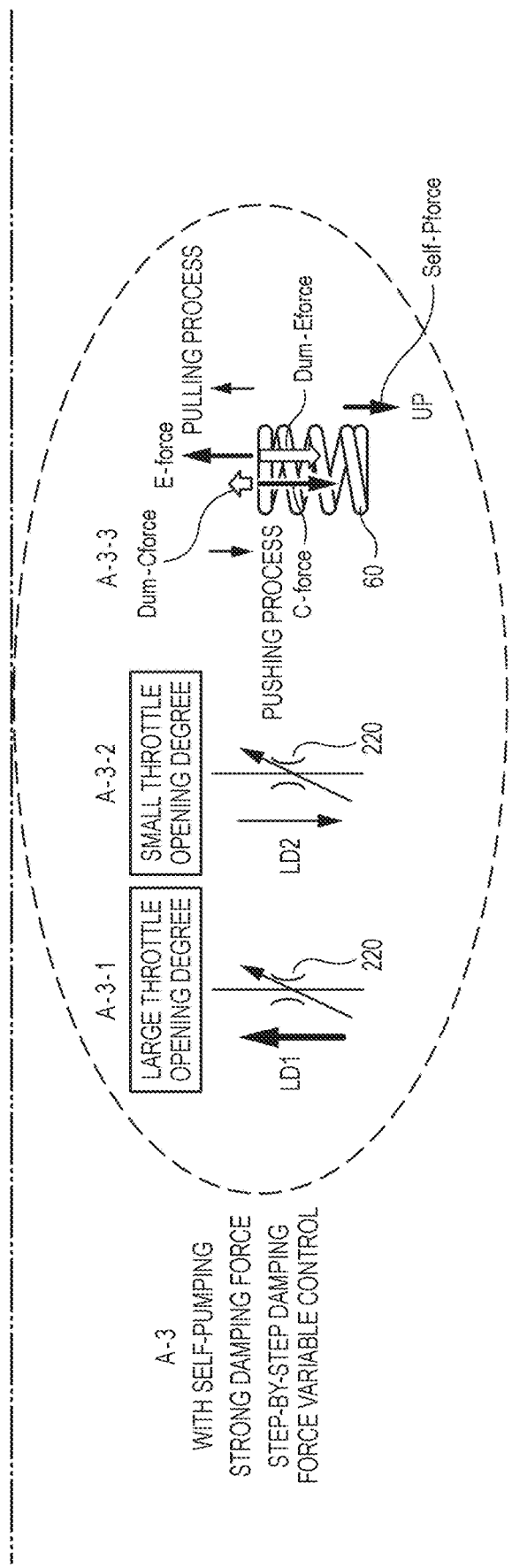
(FIG. 4 CONTINUED)

DAMPING FORCE VARIABLE SHOCK ABSORBER

CROSS-REFERENCE TO RELATED APPLICATIONS

This application is a U.S. National Phase Application under 35 U.S.C. § 371 of International Application No. PCT/JP2022/018616 filed on Apr. 22, 2022, the entire content of which is incorporated herein by reference. The International Application was published in Japanese on Oct. 26, 2023 as International Publication No. WO 2023/203773 under PCT Article 21(2).

FIELD OF THE INVENTION

The present invention relates to a damping force variable shock absorber.

BACKGROUND OF THE INVENTION

FIGS. 2 and 5 of WO2021/044552A show a vehicle height adjustment device that can perform vehicle height adjustment by self-pumping and can further adjust a damping force by a control valve having a solenoid.

Further, paragraph [0014] of JP2007-245956A describes "even when a vehicle height is deviated from a standard position during vehicle height adjustment, a damping force is set to be larger than a damping force in a case where the vehicle height adjustment is not performed, and therefore the occurrence of a bound stopper or a rebound stopper can be prevented with a simple configuration, and ride comfort can be improved".

CITATION LIST

Patent Literature

Patent Literature 1: WO2021/044552A
Patent Literature 2: JP2007-245956A

Technical Problem

Studies by the present inventors have revealed the following problem. That is, a vehicle height adjustment device of a self-pump type is affected by a damping force of a damping force generation unit, and a speed of a vehicle height increase due to self-pumping may decrease.

WO2021/044552A does not refer to this problem. JP2007-245956A merely discloses a technique for preventing the vehicle height from remaining low when there are a large number of occupants or a large amount of loads. JP2007-245956A is not related to the above-described problem in the vehicle height adjustment of the self-pump type.

An object of the present invention is to provide a damping force variable shock absorber capable of suppressing a decrease in a speed of a vehicle height increase due to self-pumping under an influence of a damping force of a damping force generation unit.

SUMMARY OF THE INVENTION

Solution to Problem

As a result of intensive studies, the present inventors have found that a decrease in the speed of the vehicle height increase due to self-pumping can be suppressed, and steering stability can be improved, by variably controlling a damping force in a pushing process and a pulling process of a spring during the vehicle height adjustment due to self-pumping. The present invention has been completed based on this finding.

Hereinafter, the present disclosure will be described.

According to one aspect of the present disclosure, there is provided a damping force variable shock absorber (150) including:

- a damping force variable mechanism (200) including a damping force generation unit (250), a damping force variable actuator (220), and a damping force control unit (210) configured to control an operation of the damping force variable actuator; and
- a vehicle height control mechanism (100) including a self-pumping mechanism (69) configured to, using a vibration caused by traveling of a vehicle as a driving force, pressurize a hydraulic oil and push a spring (60), a vehicle height variable actuator (76) configured to switch a flow path of the hydraulic oil pressurized by self-pumping, and a vehicle height control unit (110) configured to control an operation of the vehicle height variable actuator,
- in which the damping force control unit (210) performs a process-by-process damping force variable control in which a damping force in a pushing process of the spring during a period in which a vehicle height is increasing by the vehicle height control mechanism (100) is set to be weaker than a damping force in the pushing process of the spring (60) during a period in which the vehicle height is not increasing.

Advantageous Effects of Invention

According to the present invention, it is possible to provide the damping force variable shock absorber capable of suppressing the decrease in a speed of the vehicle height increase due to self-pumping under the influence of the damping force of the damping force generation unit.

BRIEF DESCRIPTION OF THE DRAWINGS

Exemplary embodiment(s) of the present invention will be described in detail based on the following figures, wherein.

DETAILED DESCRIPTION OF THE INVENTION

Embodiments of the present invention will be described below with reference to the accompanying drawings. The embodiments shown in the attached drawings is an example of the present invention, and the present invention is not limited to the embodiments.

Example 1

In the following description, the term "damping force variable shock absorber" is used, but this may be referred to as a damping force variable shock absorbing unit, a damping force variable damper, a hydraulic damper, or simply a damper.

Figure 11:
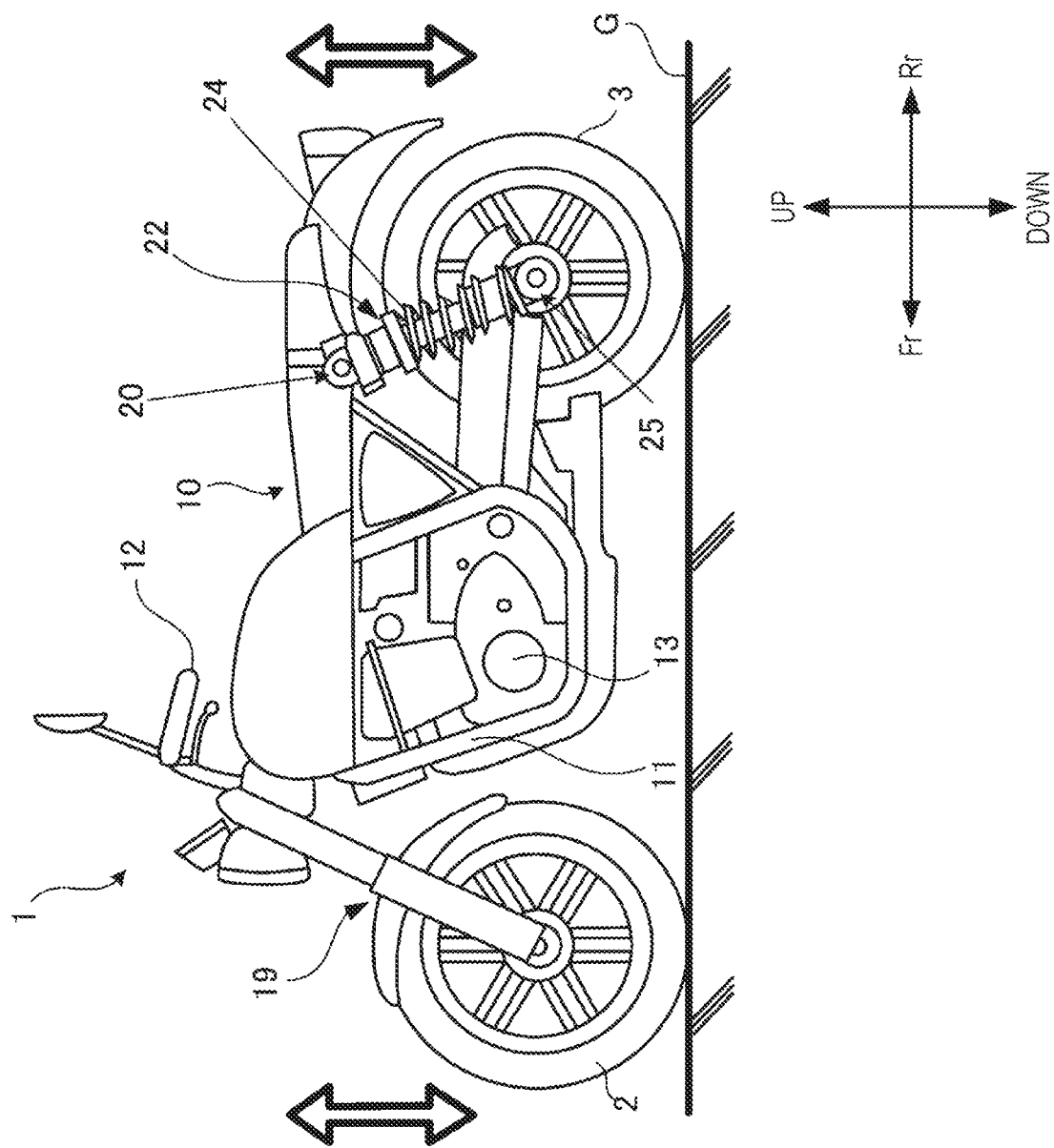
FIG. 11 is a side view of a two-wheeled vehicle equipped with the damping force variable shock absorber having the vehicle height adjustment function shown in FIG. 1.

Before describing a detailed configuration of the damping force variable shock absorber, an overall configuration of a two-wheeled vehicle equipped with the damping force variable shock absorber will be described with reference to FIG. 11. FIG. 11 is a side view of the two-wheeled vehicle equipped with the damping force variable shock absorber having a vehicle height adjustment function shown in FIG. 1.

In the following description, front and rear refer to front and rear based on a traveling direction of the vehicle. In addition, Fr indicates a front direction, Rr indicates a rear direction, UP indicates an upper direction, and DOWN indicates a lower direction.

In FIG. 11, a motorcycle 1 includes a front wheel 2 that is a wheel on a front side, a rear wheel 3 that is a wheel on a rear side, and a vehicle body 10 having a vehicle body frame 11, an accelerator grip 12, an engine 13, and the like that constitute a framework of the motorcycle 1.

The motorcycle 1 includes one front fork 19 as a front suspension portion that connects the front wheel 2 and the vehicle body 10 to each other, on each of a left side and a right side of the front wheel 2. Further, the motorcycle 1 includes one rear suspension 22 as a rear suspension portion that connects the rear wheel 3 and the vehicle body 10 to each other, on each of the left side and the right side of the rear wheel 3.

The rear suspension 22 includes a vehicle body side attachment member 20, a wheel side attachment member 25, and a spring 24. In FIG. 11, only the front fork 19 and the rear suspension 22 disposed on the left side are shown.

The front fork 19 and the rear suspension 22 are each an electronically controlled hydraulic suspension, and each of them is equipped with the damping force variable shock absorber according to the present invention.

Although not shown, the accelerator grip 12 has a built-in switch portion. For example, when a driver rotates a predetermined portion of the accelerator grip 12 in a predetermined direction, the switch portion is turned on to generate a control current, and the control current is sent to a vehicle height control mechanism to be described later to adjust a vehicle height. During vehicle height adjustment, the vehicle body 10 rises and falls while maintaining the vehicle body 10 horizontality with respect to a road surface G.

The control current may be sent to a damping force control unit, which will be described later, by an operation different from the above-described operation, so that a damping force of the hydraulic damper can be variably controlled.

Figure 1:
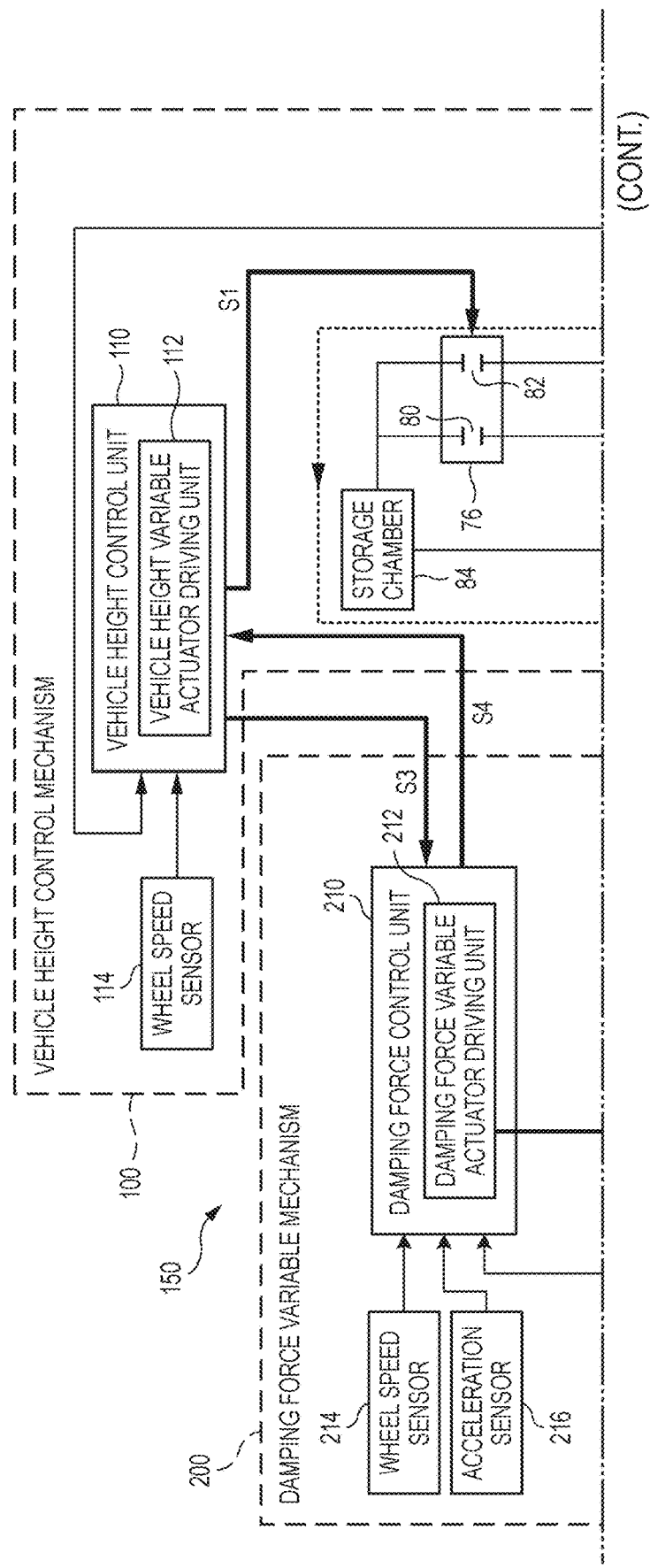
FIG. 1 is a diagram showing an example of a configuration of a damping force variable shock absorber having a vehicle height adjustment function and an example of a flow of hydraulic oil.

Next, FIG. 1 will be referred to. FIG. 1 is a diagram showing an example of a configuration of the damping force variable shock absorber having the vehicle height adjustment function and an example of a flow of hydraulic oil. The flow of the hydraulic oil includes a flow of the hydraulic oil due to self-pumping when the vehicle height increases and a flow of the hydraulic oil that absorbs an impact of a vibration generated by an external force when the vehicle height increases.

The damping force variable shock absorber 150 includes a vehicle height control mechanism 100 and a damping force variable mechanism 200.

The vehicle height control mechanism 100 includes a spring 60, a jack 62, a jack position sensor 61, a jack chamber 64, hydraulic check valves 70 and 86 as check valves, a solenoid valve 76, a storage chamber 84 that stores the hydraulic oil, and a pump chamber 66 in which a rod 68 is provided.

The spring 60 can also be referred to as a coil spring or simply a coil. One end of the spring 60 is installed in contact with a reference surface 51.

The rod 68 of the pump chamber 66 moves up and down or extends and contracts due to the vibration caused by traveling of the vehicle, and pressurizes the hydraulic oil to move the hydraulic oil. In the present specification, a pressurizing operation of the hydraulic oil using a vibration as a driving force due to traveling is referred to as self-pumping. By self-pumping, even if there is no particular electric power source, it is possible to pressurize and move the hydraulic oil by using the vibration caused by traveling of the vehicle as a power source. The pump chamber 66 and the rod 68 constitute a self-pumping mechanism 69. One end of the rod 68 is installed in contact with the reference surface 51.

The solenoid valve 76 is a type of an electromagnetic switching valve that switches a flow path of the hydraulic oil, and opening and closing of a first flow path 80 and a second flow path 82 are switched by variably controlling current amount of a current flowing through the built-in solenoid. The solenoid valve 76 functions as a vehicle height variable actuator.

A vehicle height control unit 110 includes a vehicle height variable actuator driving unit 112. The vehicle height variable actuator driving unit 112 supplies a control current whose current amount is adjusted to the solenoid valve 76 as the vehicle height variable actuator. This control current can also be referred to as a first control signal S1.

A detection signal of a wheel speed sensor 114 and a jack position detection signal of the jack position sensor 61 are supplied to the vehicle height control unit 110.

On the other hand, the damping force variable mechanism 200 includes a hydraulic damper 230, a flow rate control valve as a damping force variable actuator, specifically, for example, an electromagnetic proportional throttle valve 220, and a damping force control unit 210 that controls an operation of the electromagnetic proportional throttle valve 220.

The electromagnetic proportional throttle valve 220 and the hydraulic damper 230 constitute a damping force generation unit 250.

In the electromagnetic proportional throttle valve 220, a throttle opening degree is changed in proportion to a current amount of a current flowing through a proportional solenoid (not shown), and the flow rate of the hydraulic oil can be continuously changed.

The damping force control unit 210 includes a damping force variable actuator driving unit 212. The damping force variable actuator driving unit 212 supplies a control current whose current amount is adjusted to the proportional solenoid of the electromagnetic proportional throttle valve 220 as an actuator. This control current can also be referred to as a second control signal S2. The throttle opening degree of the electromagnetic proportional throttle valve 220 is, for example, continuously changed by the control current, and thus the damping force can be variably controlled.

Detection signals of a wheel speed sensor 214 and an acceleration sensor 216 and a detection signal of a stroke sensor 218 that detects the stroke of the hydraulic damper 230 are supplied to the damping force control unit 210.

The hydraulic damper 230 includes a damper tube 233, a piston 240, a piston rod 242, an upper oil chamber 232, and a lower oil chamber 234. One end of the piston rod 242 is connected to the piston 240, and the other end of the piston rod 242 is installed in contact with the reference surface 51.

When the piston 240 moves upward and the upper oil chamber 232 is compressed, the hydraulic oil flows from the damper tube 233 to the jack chamber 64, and the spring 60 is compressed.

When the piston 240 moves downward and the lower oil chamber 234 is compressed, the hydraulic oil flows from the jack chamber 64 to the damper tube 233, the hydraulic oil flows into the damper tube 233, and the spring 60 extends.

The piston 240 is provided with a flow path constituted by a check valve 243 and a throttle valve 245, in other words, a first orifice, and a flow path constituted by a throttle valve 247 and a check valve 249, in other words, a second orifice. By appropriately setting the throttle valves 245 and 247, the damping force characteristics of the hydraulic damper can be adjusted.

A throttle setting unit capable of setting a throttle amount may be provided in each of the throttle valves 245 and 247, and the damping force may be variably set by the driver manually operating the setting unit.

The damping force control unit 210 and the vehicle height control unit 110 can perform respective control operations independently, in a state where there is no vehicle height increase due to self-pumping.

On the other hand, in a state where there is a vehicle height increase due to self-pumping, the damping force control unit 210 and the vehicle height control unit 110 can perform a cooperative control by mutually associating a damping force variable control and a vehicle height control with each other. The cooperative control can be said to be, for example, a control of a relationship in which an output result of the other control unit adaptively changes according to a state of one control unit.

For example, as will be described later, the damping force control unit 210 performs a process-by-process damping force variable control for changing the damping force value when the vehicle height increases. A timing of the control operation is preferably synchronized with a timing of a vehicle height variable control performed by the vehicle height control unit 110, that is, a timing of a switching operation of the flow path of the solenoid valve 76 which is an electromagnetic switching valve, and therefore it is preferable that the control units 110 and 210 perform the control operations in synchronization with each other by matching the timings.

In this case, for example, the vehicle height control unit 110 may transmit a timing control signal as the control signal S3 to the damping force control unit 210, and the damping force control unit 210 may determine a start timing of the process-by-process damping force variable control based on the received timing control signal.

During the vehicle height increase, the vehicle height control unit 110 may calculate a speed of the vehicle height increase based on the detection signal from the jack position sensor 61 and transmit the calculation result as the control signal S3 to the damping force control unit 210, and the damping force control unit 210 may appropriately change a switching cycle of the damping force in the process-by-process damping force variable control based on the received information on the speed of the vehicle height increase.

It can be assumed that some abnormality occurs during the vehicle height increase, and a movement of the piston 240 of the damping force generation unit 250 is disturbed. In such a case, the damping force control unit 210 may notify the vehicle height control unit 110 of a signal for notifying the abnormality as the control signal S4, and in response to this, the vehicle height control unit 110 can also perform cooperative operations such as temporarily stopping a vehicle height increasing operation and switching to a vehicle height maintaining operation.

The cooperative operation is an example, and the content of the cooperative control is not limited to the cooperative operation described above.

The damping force control unit 210 and the vehicle height control unit 110 perform the cooperative control in cooperation with each other, so that the timings of the respective controls coincide with each other and efficient and stable vehicle height adjustment is possible. In addition, when an abnormality occurs, both of the control units cooperate to cope with each other, and therefore an effect of accelerating the recovery from an abnormal state to a normal state can be expected.

Next, the operation of each unit when the vehicle height increases and the flow of the hydraulic oil will be described. In FIG. 1, the flow of the hydraulic oil is indicated by arrows of a solid line, a broken line, and a dash-dotted line.

When a power supply of a vehicle, for example, a motorcycle, is turned on, the vehicle height variable actuator driving unit 112 supplies a low current among the control currents of three stages, for example, as the first control signal S1 to the solenoid valve 76. Accordingly, the first flow path 80 in the solenoid valve 76 is closed, and the vehicle height can be increased.

When the vehicle starts traveling and self-pumping is started due to unevenness of the road surface, the hydraulic oil is pressurized to open the check valve 70, and the hydraulic oil moves from the pump chamber 66 to the jack chamber 64 as indicated by a solid line arrow LE.

Accordingly, the jack 62 moves downward, and a length of the spring 60 is shortened. The shortening of the length of the spring 60 means that a reaction force of the spring 60 increases, and a force against a load applied to the vehicle body 10 increases, so that the vehicle height increases.

In this way, the spring 60 is compressed by self-pumping. However, the spring 60 vibrates constantly and finely due to the vibration during traveling, separately from compression by self-pumping. In order to absorb the impact caused by the vibration, the hydraulic oil moves corresponding to the vibration, and the impact is absorbed by the electromagnetic proportional throttle valve 220 and the hydraulic damper 230.

The electromagnetic proportional throttle valve 220 absorbs the impact by restricting the movement of the hydraulic oil by the throttle. Further, the hydraulic damper 230 absorbs the impact by the movement of the piston 240 in the upper-lower direction, in other words, by the restriction of the movement of the hydraulic oil by the throttle of the throttle valves 243 and 249 constituting orifices provided in the piston 240.

If the flow rate of the moving hydraulic oil is large, the force that reduces the impact of the vibration of the spring 60 and converges the vibration of the spring 60, that is, the damping force becomes weak, and the vibration continues for a long time.

If the flow rate of the moving hydraulic oil is small, the damping force becomes strong, and the vibration is quickly converged.

The ride comfort changes depending on the magnitude of the damping force. In addition, when the damping force is large, energy that causes the hydraulic oil to slide and move on an inner wall of the pump chamber during self-pumping tends to decrease, and therefore, the damping force generated by the damping force variable damper needs to be appropriately set in consideration of the speed of the vehicle height increase due to self-pumping.

When the spring 60 is compressed by the vibration, a flow LD1 of the hydraulic oil indicated by a dash-dotted line in FIG. 1 is generated. In this case, the hydraulic oil is pushed out from the damper tube 233 of the hydraulic damper 230, and moves to the jack chamber 64 via the electromagnetic proportional throttle valve 220 and the check valves 86 and 70. In the damper tube 233, a flow LD3 of the hydraulic oil indicated by a dash-dotted line arrow is generated.

When the spring 60 is extended by the vibration, a flow LD2 of the hydraulic oil indicated by a broken line in FIG. 1 is generated. In this case, the hydraulic oil is pushed out from the jack chamber 64 and moves to the upper oil chamber 232 of the hydraulic damper 230 via the second flow path 82 of the solenoid valve 76, the storage chamber 84, and the electromagnetic proportional throttle valve 220. In the damper tube 233, a flow LD4 of the hydraulic oil indicated by a broken line arrow is generated.

Figure 2:
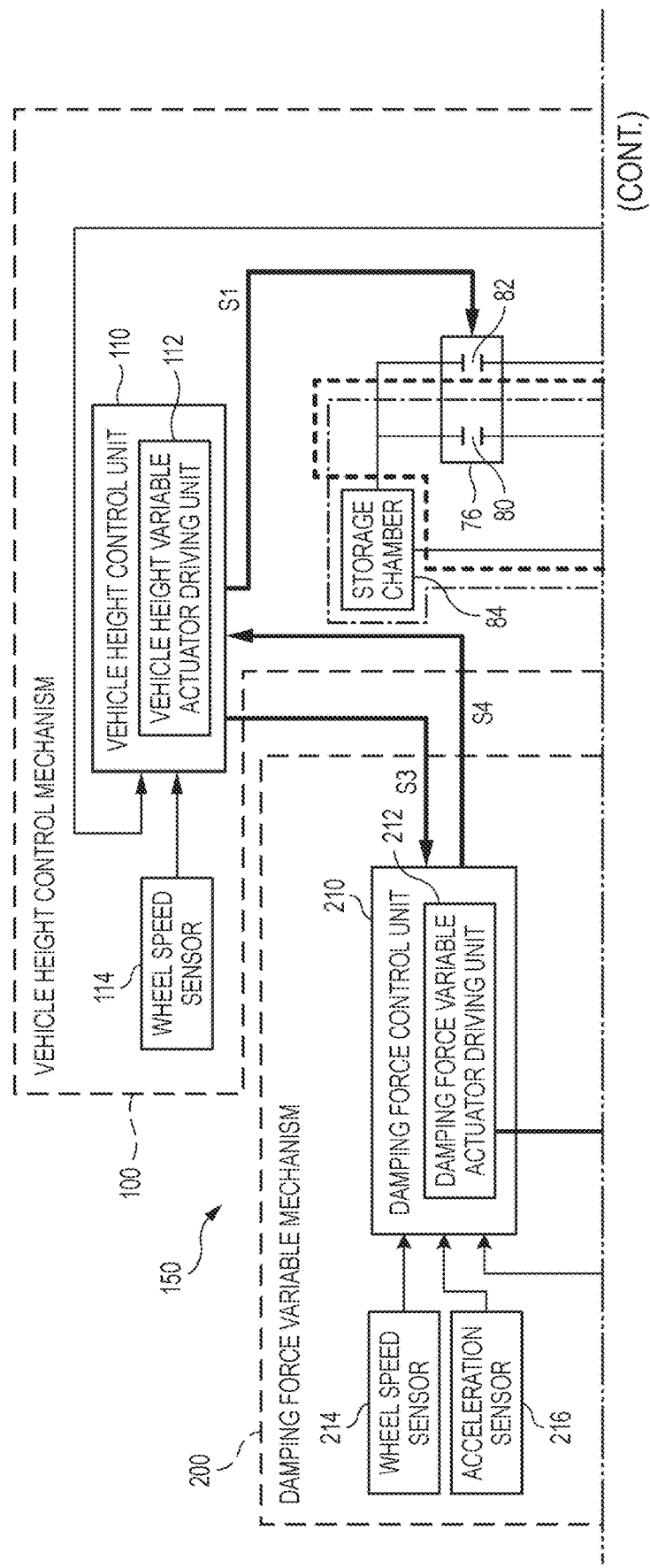
FIG. 2 is a diagram showing a flow of hydraulic oil corresponding to each of operations of increasing, maintaining, and decreasing a vehicle height shown in FIG. 1.

Next, FIG. 2 will be referred to. FIG. 2 is a diagram showing a flow of the hydraulic oil corresponding to each of operations of increasing, maintaining, and decreasing the vehicle height shown in FIG. 1. In FIG. 2, the same parts as those in FIG. 1 are denoted by the same reference numerals. Since the vehicle height increase has been described above, the operations of maintaining and decreasing the vehicle height will be described here.

First, the operation of maintaining the vehicle height will be described. When the jack 62 reaches a predetermined target position, the jack position sensor 61 detects the arrival and sends a detection signal to the vehicle height control unit 110. Accordingly, 112 of the vehicle height control unit 110 supplies a middle current of the control currents of the three stages as the first control signal S1 to the solenoid valve 76.

In this case, as indicated by a dash-dotted line arrow LG, the hydraulic oil moves via the first flow path 80, the storage chamber 84, and the check valve 86, but the same amount of the hydraulic oil delivered from the pump chamber 66 is returned to the pump chamber 66, and the amount of the hydraulic oil in the jack chamber 64 does not change. Accordingly, the vehicle height is maintained.

When the vehicle height is decreased, the vehicle height variable actuator driving unit 112 supplies a high current of the control currents of the three stages as the first control signal S1 to the solenoid valve 76.

In this case, as indicated by a broken line arrow LF, the hydraulic oil moves from the jack chamber 64 to the pump chamber 66 via the second flow path 82 of the solenoid valve 76, the storage chamber 84, and the check valve 86. Accordingly, the spring 60 is extended, and thus the length of the spring 60 is increased.

An increase in the length of the spring 60 means a decrease in the reaction force of the spring 60, and since the force against the load applied to the vehicle body 10 is weakened, the vehicle height is decreased.

Figure 3:
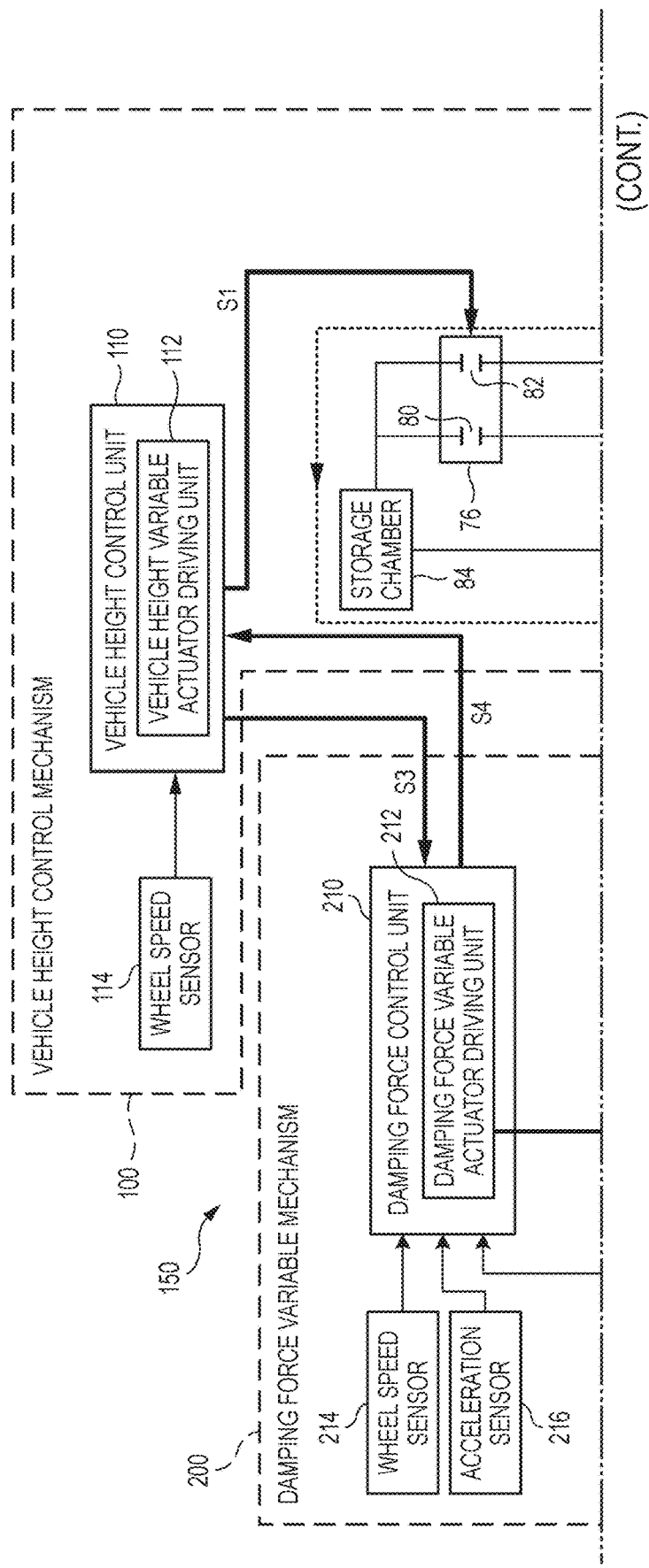
FIG. 3 is a diagram showing an example of the flow of the hydraulic oil and a damping force generated when performing a process-by-process damping force variable control for variably controlling the damping force when a vehicle height increases by self-pumping.

Next, FIG. 3 will be referred to. FIG. 3 is a diagram showing an example of the flow of the hydraulic oil and the damping force generated when performing the process-by-process damping force variable control for variably controlling the damping force when vehicle height increases by self-pumping. In FIG. 3, the same parts as those in the above drawings are denoted by the same reference numerals.

When the traveling of the vehicle is started, the vehicle body moves up and down due to the unevenness of the road surface, and corresponding to this, an external force in a pushing direction that pushes and compresses the spring 60 and an external force in a pulling direction that pulls and extends the spring 60 are alternately generated. In other words, a pushing process and a pulling process alternately occur in relation to the vibration due to the external force of the spring 60.

In FIG. 3, the external force in the pushing direction is denoted by C-force (compression-force), and the damping force for damping the external force in the pushing direction is denoted by Dum-Cforce (Dumping-Cforce).

The external force in the pulling direction is denoted by E-force (Elongation-force), and a damping force for damping the external force in the pulling direction is denoted by Dum-Eforce (Dumping-Eforce).

In the following description, the damping force Dum-Cforce for damping the external force in the pushing direction is referred to as a damping force in the pushing process of the spring, and the damping force Dum-Eforce for damping the external force in the pulling direction is referred to as a damping force in the pulling process of the spring.

In FIG. 3, C-force and E-force are indicated by solid line arrows. The Dum-Cforce and the Dum-Eforce are indicated by white arrows.

A direction of the flow of the hydraulic oil shown in FIG. 3 is the same as that in FIG. 1. However, FIG. 3 is different from FIG. 1 in that the process-by-process damping force variable control for variably controlling the damping force is performed when the vehicle height increases.

As described above, the driver can set the strength of the damping force generated by the damping force variable mechanism 200 to his or her own preference by using an electronic control or by manual setting.

The damping force of the damping force generation unit 250 can be set to at least a first level at which the damping force is relatively weak and a second level at which the damping force is relatively strong. When the damping force is at the first level, a so-called soft ride comfort is obtained, and when the damping force is at the second level, a so-called hard ride comfort is obtained.

Here, according to the study of the present inventors, for example, when the damping force is set to the second level at which the damping force is relatively strong, the vibration of the spring 60 due to the unevenness of the road surface is quickly converged, and thus it is clear that the vibration serving as a driving force for increasing the vehicle height due to self-pumping tends to be insufficient, and the speed of the vehicle height increase may decrease.

In order to suppress a decrease in the speed of the vehicle height increase, in an example of FIG. 3, the process-by-process damping force variable control is performed.

As described above, the damping force of the damping force generation unit 250 can be set to at least the first level at which the damping force is relatively weak and the second level at which the damping force is relatively strong, and the damping force control unit 210 may perform the process-by-process damping force variable control when the damping force of the damping force generation unit 250 is set to the first level or the second level and the vehicle height is increasing by self-pumping.

In the following description, it is assumed that the damping force is set to the second level, that is, the relatively strong level, and in this situation, the vehicle starts traveling and a vehicle height increase control by self-pumping is started.

This is because, when the set damping force is at the relatively weak level, it is considered that the vibration serving as the driving force of the self-pumping is hardly excessively prevented, and on the other hand, when the damping force is at the relatively strong level, the vibration tends to be excessively prevented, and it is often necessary to take measures.

By the process-by-process damping force variable control, which will be described later, the vibration, which is the driving force of the self-pumping, is not excessively prevented, and it is possible to improve the speed of the vehicle height increase or the steering stability.

However, this is an example, and the present invention is not limited to this example. That is, even when the damping force is set to the first level, that is, the relatively weak level, the process-by-process damping force variable control may be performed if necessary.

In this case, for example, it is possible to prevent the amplitude of the vehicle height fluctuation in a state where the vehicle height reaches the vicinity of a desired height position, and to obtain an effect of improving the ride comfort.

In FIG. 3, the dash-dotted line arrow indicating the flow LD1 of the hydraulic oil in the pushing process of the spring 60 is indicated by a thick line, which indicates that the flow rate is large.

That the flow rate of the flow LD1 of the hydraulic oil in the pushing process of the spring 60 is large means that, in other words, the damping force Dum-Cforce generated by the flow LD1 of the hydraulic oil is set to be small. In FIG. 3, a length of a white arrow indicating Dum-Cforce is drawn short.

On the other hand, the flow rate of the flow LD2 of the hydraulic oil in the pulling process of the spring 60 is the same as in FIG. 1 or smaller than in FIG. 1. In FIG. 3, the flow rate of the flow LD2 of the hydraulic oil is the same as that in FIG. 1. In FIG. 3, a length of a white arrow indicating Dum-Eforce is drawn long.

The reason why the damping force Dum-Cforce in the pushing process of the spring 60 is set to be small is that the external force C-force in the pushing direction acts in the direction of compressing the spring 60, and therefore is a useful external force for enhancing the vehicle height increase due to self-pumping, and this is because it is not preferable to significantly reduce this from the viewpoint of improving the speed of the vehicle height increase.

On the other hand, regarding the external force E-force in the pulling direction, it can be said that it is preferable to change an attenuation amount from the viewpoint of improving the speed of the vehicle height increase. However, since the change of the damping amount affects the ride comfort, in consideration of this point, in the example of FIG. 3, the damping force Dum-Eforce is set to be the same regardless of whether the jack is increasing or not, that is, regardless of whether the vehicle height is increasing or not.

According to the process-by-process damping force variable control, the damping force Dum-Cforce in the pushing process of the spring 60 is set to be small, the damping force Dum-Eforce in the pulling process of the spring 60 is not changed, and therefore a push-side damping force of the entire suspension can be made equal whether the jack is increasing or not.

On the other hand, since the damping force Dum-Cforce in the pushing process of the spring 60 is set to be small, the useful external force C-force for enhancing the vehicle height increase due to self-pumping is not significantly reduced, and the vibration serving as the driving force of the self-pumping can be secured to a certain extent. Accordingly, it is possible to suppress the decrease in the speed of the vehicle height increase.

As described above, the damping force variable shock absorber 150 includes the damping force variable mechanism 200 including the damping force generation unit 250, the damping force variable actuator 220, and the damping force control unit 210 configured to control the operation of the damping force variable actuator, and the vehicle height control mechanism 100 including the self-pumping mechanism 69 configured to, using the vibration caused by the traveling of the vehicle as the driving force, pressurize the hydraulic oil and push the spring 60, the vehicle height variable actuator 76 configured to switch the flow path of the hydraulic oil pressurize by self-pumping, and the vehicle height control unit 110 configured to control the operation of the vehicle height variable actuator. The damping force control unit 210 performs the process-by-process damping force variable control in which the damping force in the pushing process of the spring 60 during a period in which the vehicle height is increasing by the vehicle height control mechanism 100 is set to be weaker than the damping force in the pushing process of the spring 60 during a period in which the vehicle height is not increasing, that is, a damping force of normal setting.

As a result, it is possible to realize the ride comfort desired by the driver while maintaining an appropriate damping force, and it is possible to leave a certain degree of vibration component and secure a required vehicle height adjustment speed by not excessively preventing the external force of the vibration serving as the driving force of the self-pumping. In addition, the effect of improving a steering stability performance can also be obtained by reducing a difference in damping characteristics between when the vehicle height is increasing and when the vehicle height is not increasing. This will be described later.

Figure 4:
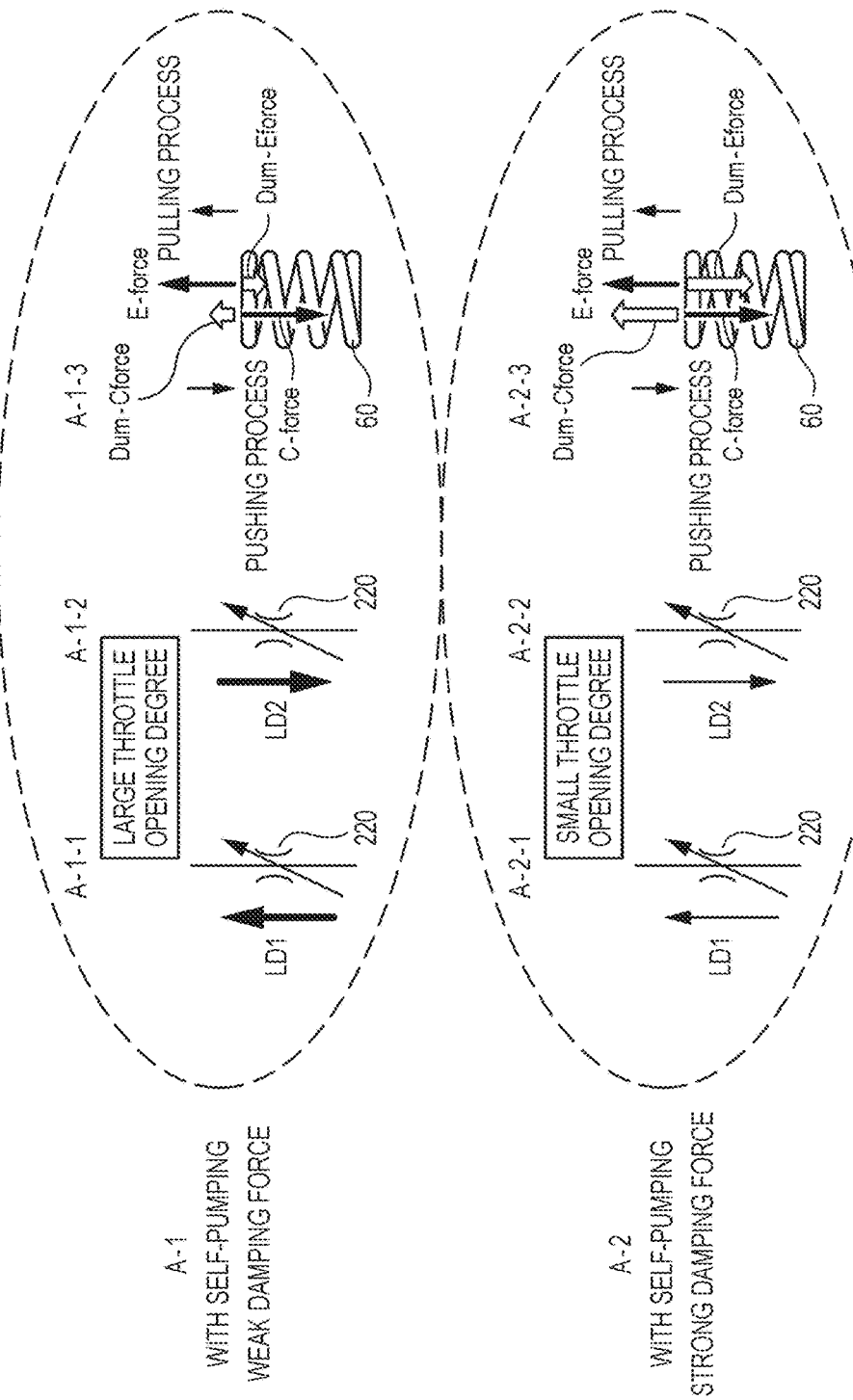
FIG. 4 is a graph showing a relationship between a throttle opening degree of a flow rate control valve and the damping force.

Next, FIG. 4 will be referred to. FIG. 4 is a graph showing a relationship between the throttle opening degree of the flow rate control valve and the damping force. In FIG. 4, the same parts as those in FIG. 3 are denoted by the same reference numerals.

A-1 of FIG. 4 shows an example of the throttle opening degree of the flow rate control valve and an example of the generated damping force when the self-pumping is present and the damping force is set to the weak level. As indicated by A-1-1 and A-1-2, the throttle opening degree of the flow rate control valve 220 is set to be large. The flow rates of the flows LD1 and LD2 of the hydraulic oil both increase. As indicated by A-1-3, the damping forces of the damping force Dum-Cforce in the pushing process of the spring 60 and the damping force Dum-Eforce in the pulling process of the spring 60 are both small.

A-2 of FIG. 4 shows an example of the throttle opening degree of the flow rate control valve and an example of the generated damping force when the self-pumping is present and the damping force is set to the strong level. As shown in A-2-1 and A-2-2, the throttle opening degree of the flow rate control valve 220 is set to be small. The flow rates of the flows LD1 and LD2 of the hydraulic oil both decrease. As indicated by A-2-3, the damping forces of the damping force Dum-Cforce in the pushing process of the spring 60 and the damping force Dum-Eforce in the pulling process of the spring 60 are both large.

A-3 of FIG. 4, an example of the throttle opening degree of the flow rate control valve and an example of the generated damping force when the self-pumping is present, the damping force is set to the strong level, and the process-by-process damping force variable control is performed.

As shown in A-3-1, in the pushing process of the spring 60, the throttle opening degree of the flow rate control valve 220 is set to be large, and the flow rate of the flow LD1 of the hydraulic oil increases. Accordingly, the damping force Dum-Cforce decreases.

As a result, the attenuation of the external force C-force useful for increasing the vehicle height is alleviated, and the vibration due to the external force is maintained to a certain extent. As a result, the vibration serving as the driving force for increasing the vehicle height remains without being excessively attenuated, and the decrease in the speed of the vehicle height increase is alleviated.

On the other hand, in the pulling process of the spring 60, as described above, the damping force Dum-Eforce in the pulling process of the spring 60 is not changed. As a result, the push-side damping force of the entire suspension can be made equal whether the jack is increasing or not.

The throttle opening degree of the flow rate control valve 220 is set to be small, and the flow rate of the flow LD2 of the hydraulic oil decreases. Accordingly, the damping force Dum-Eforce increases. As a result, the external force E-force that prevents the vehicle height increase is greatly attenuated according to the initial damping force setting. This secures a hard ride comfort desired by the driver.

In this way, it is possible to realize a desired ride comfort and a desired speed of the vehicle height increase. In other words, it is possible to achieve both ride comfort and the speed of the vehicle height increase.

Figure 5:
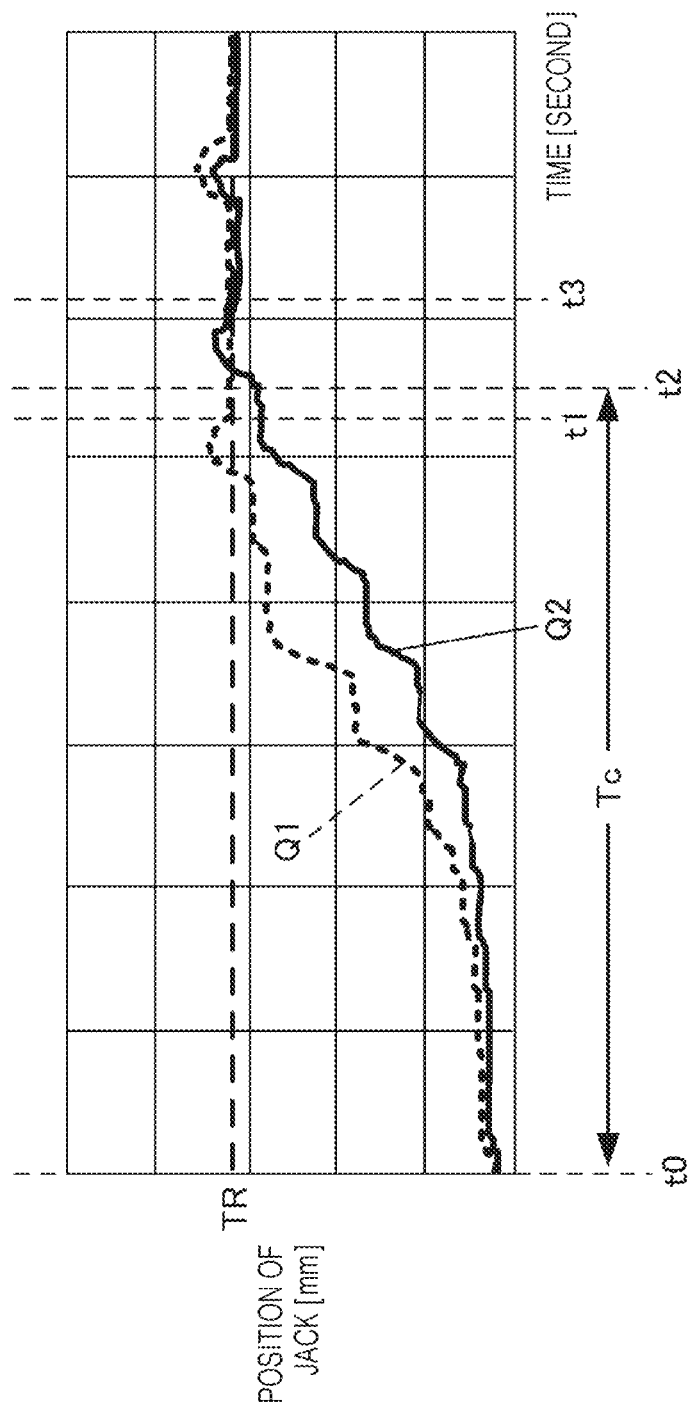
FIG. 5 is a diagram showing a difference in an increasing speed of a jack when the damping force is set to a weak level, or the damping force is set to a strong level, and when the process-by-process damping force variable control is not performed.

Next, FIG. 5 will be referred to. FIG. 5 is a diagram showing a difference in an increasing speed of the jack when the damping force is set to be weak, or set to be strong, and when the process-by-process damping force variable control is not performed.

In FIG. 5, a horizontal axis indicates elapsed time from the start of the self-pumping, and a vertical axis indicates the position of the jack.

A characteristic line Q1 indicates a change in the position of the jack with respect to time when the damping force is set to the weak level and the process-by-process damping force variable control is not performed. The characteristic line Q1 corresponds to the example of A-1 in FIG. 4.

In the example indicated by the characteristic line Q1, the position of the jack reaches a target position TR at a time point t1. A time point t2 is a time point corresponding to the maximum allowable time Tc. In the example of the characteristic line Q1, the position of the jack reaches the target position TR within the allowable time Tc.

On the other hand, a characteristic line Q2 indicates a change in the position of the jack with respect to time when the damping force is set to the strong level and the process-by-process damping force variable control is not performed. The characteristic line Q2 corresponds to the example of A-2 in FIG. 4.

In the example indicated by the characteristic line Q2, the position of the jack reaches the target position TR at a time point t3. In the example of the characteristic line Q2, time longer than the allowable time Tc is required for the position of the jack to reach the target position TR. Accordingly, the position of the jack is required to reach the target position within the allowable time Tc.

Figure 6:
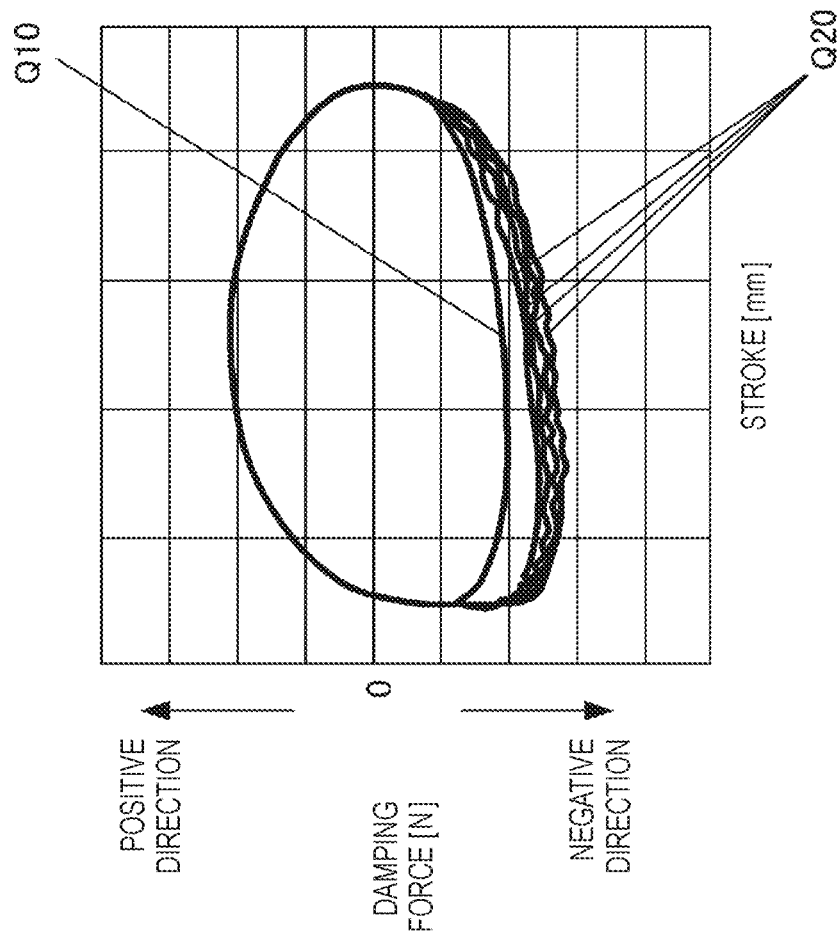
FIG. 6 is a characteristic diagram based on a Lissajous curve showing a change in the damping force with respect to a stroke length when the damping force is set to the strong level and the process-by-process damping force variable control is not performed.

Next, FIG. 6 will be referred to. FIG. 6 is a characteristic diagram based on a Lissajous curve showing a change in the damping force with respect to a stroke length when the damping force is set to the strong level and the process-by-process damping force variable control is not performed.

A characteristic line Q10 indicates a characteristic when there is no vehicle height increasing operation due to self-pumping. A characteristic line Q20 indicates a characteristic when there is a vehicle height increasing operation by self-pumping.

A damping force value of the characteristic line Q20 is significantly larger than a damping force value of the characteristic line Q10. In other words, during self-pumping, a shape of the Lissajous curve deviates from a normal shape. This is because, during self-pumping, in addition to a normal external force applied to the spring, a force for pushing up the jack normally acts, so that the external force apparently increases by the force for pushing up the jack or a reaction force of the force, and accordingly, the generated damping force tends to have a value higher than a design value.

During self-pumping, when an actual damping force deviates from a damping force of the design value, the steering stability performance of the vehicle is affected, for example, it cannot be said that there are no cases where the driver cannot operate the vehicle as intended or expected. Accordingly, it is required to prevent the deviation and bring the attenuation value set during self-pumping close to the design value.

Figure 7:
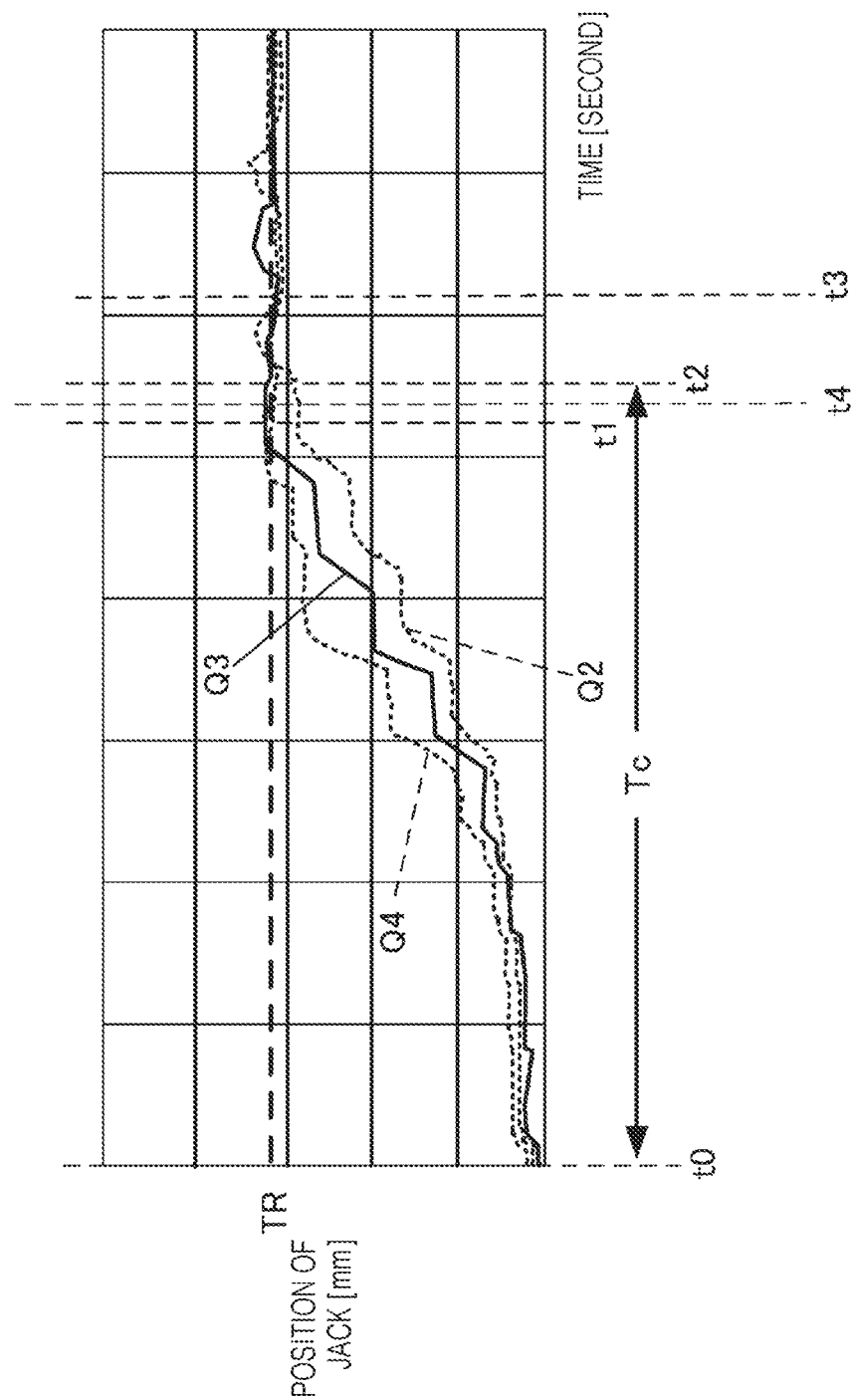
FIG. 7 is a diagram showing a difference in the increasing speed of the jack when the damping force is set to the weak level, or the damping force is set to the strong level, and when the process-by-process damping force variable control is performed.

Next, FIG. 7 will be referenced. FIG. 7 is a diagram showing a difference in the increasing speed of the jack when the damping force is set to the weak level, or the damping force is set to the strong level, and when the process-by-process damping force variable control is performed.

In FIG. 7, the same parts as those in FIG. 6 are denoted by the same reference numerals. However, in FIG. 7, the characteristic line Q2 of FIG. 6 is indicated by a broken line.

A characteristic line Q3 shown in FIG. 7 indicates a change in the position of jack with respect to time when the damping force is set to the strong level and the process-by-process damping force variable control described above with reference to FIGS. 3 and 4 is performed. The characteristic line Q3 corresponds to the example of A-3 in FIG. 4.

As described above with reference to FIGS. 3 and 4, when the process-by-process damping force variable control is performed, the damping force obtained by combining the respective damping forces in the pushing process and the pulling process of the spring is reduced from the damping force of an original strong level and becomes the damping force of the medium level. As a result, the vibration as the driving force of the self-pumping is not excessively prevented, and a certain degree of vibration is secured.

Accordingly, in the example of the characteristic line Q3, the speed of the vehicle height increase due to self-pumping is improved as compared with the example indicated by the characteristic line Q2.

Accordingly, in the example indicated by the characteristic line Q3, the position of the jack reaches the target position TR at a time point t4. In other words, the jack can reach the target position within the allowable time Tc. Accordingly, the problem described with reference to FIG. 5 is solved, and a performance of a vehicle height increase by self-pumping is improved.

Further, a characteristic line Q4 shown in FIG. 7 indicates a change in the position of the jack with respect to time when the damping force is set to the weak level and the process-by-process damping force variable control is performed.

The characteristic line Q4 corresponds to the characteristic line Q1 shown in FIG. 5 described above. In the characteristic line Q4, in a state where the position of the jack reaches the vicinity of the target position TR, that is, in a state after the time point t2, the fluctuation of the amplitude is prevented compared to the characteristic line Q1. In other words, the amplitude of the vehicle height fluctuation can be prevented by the process-by-process damping force variable control. Accordingly, it is possible to obtain the effect of improving the ride comfort.

Figure 8:
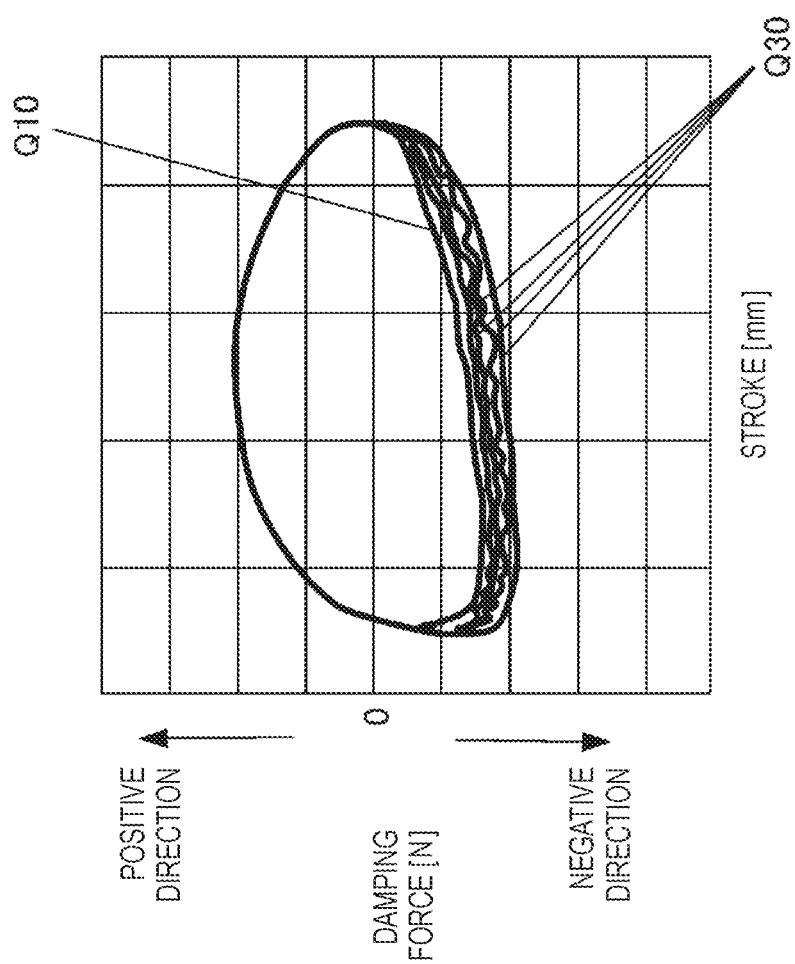
FIG. 8 is a characteristic diagram based on a Lissajous curve showing a change in the damping force with respect to the stroke length when the damping force is set to the strong level and the process-by-process damping force variable control is performed.

Next, FIG. 8 will be referred to. FIG. 8 is a characteristic diagram based on a Lissajous curve showing a change in the damping force with respect to the stroke length when the damping force is set to the strong level and the process-by-process damping force variable control is performed.

A characteristic line Q10 indicates a characteristic when there is no vehicle height increasing operation due to self-pumping. A characteristic line Q30 indicates a characteristic when the vehicle height increasing operation is performed by the self-pumping and the process-by-process damping force variable control is performed.

As described above with reference to FIGS. 3 and 4, when the process-by-process damping force variable control is performed, according to the process-by-process damping force variable control, the damping force Dum-Cforce in the pushing process of the spring 60 is set to be small, the damping force Dum-Eforce in the pulling process of the spring 60 is not changed, and therefore the push-side damping force of the entire suspension can be made equal whether the jack is increasing or not.

Therefore, the damping force value of the characteristic line Q30 during self-pumping becomes small, and the characteristic line Q30 approaches the characteristic line Q10 in the normal state.

In other words, in the example of the characteristic line Q30, the shape of the Lissajous curve during self-pumping is prevented from deviating from the normal shape. This prevents the actual damping force from greatly deviating from the damping force of the design value during self-pumping. Therefore, the steering stability performance of the vehicle is improved, and the vehicle can be easily operated as intended or expected by the driver.

Example 2

Figure 9:
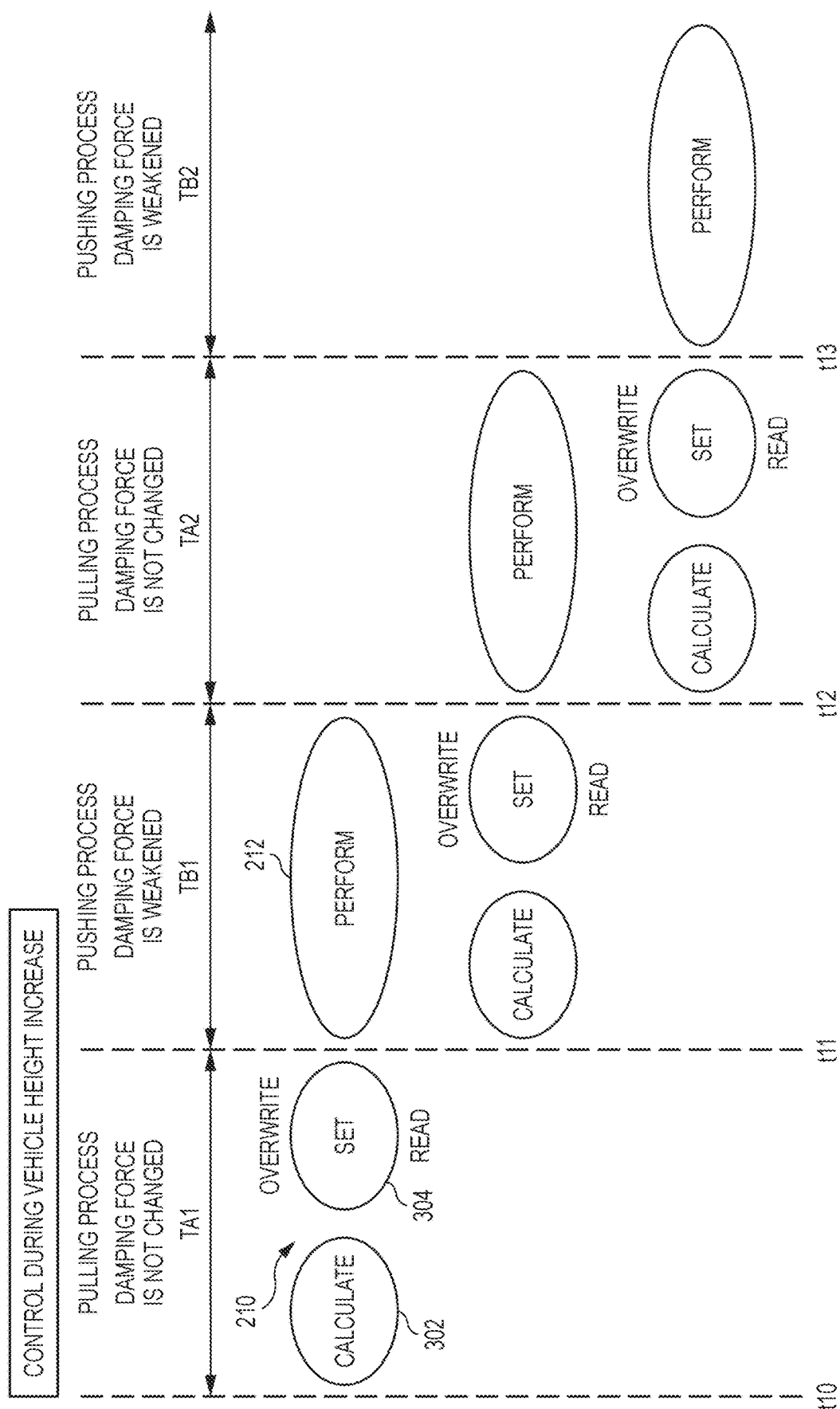
FIG. 9 is a diagram showing an example of the process-by-process damping force variable control of an overwrite method.

Next, FIG. 9 will be referred to. FIG. 9 is a diagram showing an example of the process-by-process damping force variable control of an overwrite method. FIG. 9 shows a control during the vehicle height increase.

In the example of FIG. 9, the damping force control unit 210 includes a calculation unit 302 that calculates a control signal value of the electromagnetic proportional throttle valve 220 serving as the damping force variable actuator, in other words, the value of the control current, an overwrite setting unit 304 that overwrites the current control signal value with the calculated new control signal value when the control signal value is updated in the process-by-process damping force variable control, and the damping force variable actuator driving unit 212 that drives the damping force variable actuator 220 based on the control signal value read from the overwrite setting unit 304.

In FIG. 9, a period from a time point t10 to a time point t11 is a pulling process period TA1 of the spring 60, a period from a time point t11 to a time point t12 is a pushing process period TB1 of the spring 60, a period from a time point t12 to a time point t13 is a pulling process period TA2 of the spring 60, and a period from a time point t13 to a time point t14 is a pushing process period TB2 of the spring 60. As described above, during the pulling process periods TA1 and TA2, the damping force is the same as the damping force when there is no vehicle height increase, and there is no change. During the pushing process periods TB1 and TB2, the damping force is set to be weaker than the damping force when there is no vehicle height increase.

According to the configuration and a control method of FIG. 9, for example, a series of operations can be efficiently performed by using a storage device such as an overwrite register as the overwrite setting unit and adjusting a write/read timing for the storage device. The overwrite method has an advantage that timing adjustment is easy.

Example 3

Figure 10:
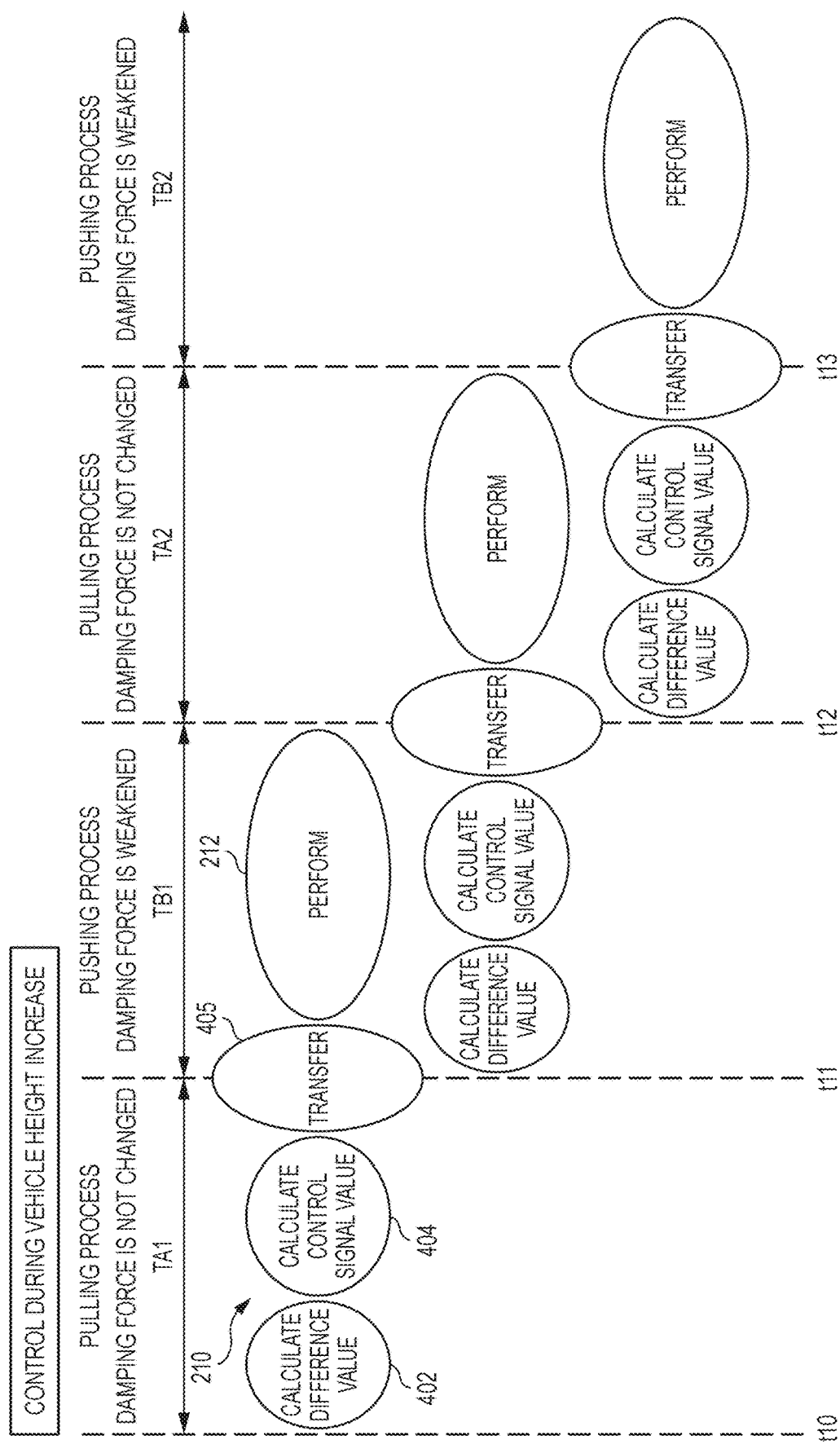
FIG. 10 is a diagram showing an example of the process-by-process damping force variable control of a difference subtraction method.

Next, FIG. 10 will be referred to. FIG. 10 is a diagram showing an example of the process-by-process damping force variable control of a difference subtraction method. In FIG. 10, the same parts as those in FIG. 9 are denoted by the same reference numerals.

In FIG. 10, the period from the time point t10 to the time point t11 is the pulling process period TA1 of the spring 60, the period from the time point t11 to the time point t12 is the pushing process period TB1 of the spring 60, the period from the time point t12 to the time point t13 is the pulling process period TA2 of the spring 60, and the period from the time point t13 to the time point t14 is the pushing process period TB2 of the spring 60. As described above, during the pulling process periods TA1 and TA2, the damping force is the same as the damping force when there is no vehicle height increase, and there is no change. During the pushing process periods TB1 and TB2, the damping force is set to be weaker than the damping force when there is no vehicle height increase.

The damping force control unit 210 includes a calculation unit 404 that calculates a new control signal value by subtracting a second value, which is a constant value or a variable whose value changes according to a situation, from a first value serving as a reference, when a control signal value of the electromagnetic proportional throttle valve 220 serving as the damping force variable actuator, in other words, the value of the control current is updated.

As the first value serving as a reference, for example, a control signal value corresponding to the current attenuation value or a control signal value of a fixed value prepared in advance can be used.

When the second value is a variable, since it is necessary to calculate the second value which is a difference value, a difference value calculation unit 402 is provided in front of the calculation unit 404. When the second value which is the difference value is a constant value, in other words, a fixed value, it is not necessary to obtain the second value by calculation, and thus the difference value calculation unit 402 is not necessary.

When timing adjustment is necessary, for example, a transfer control unit 405 such as a transfer gate with an output enable function may be provided in a signal transmission path, and an output timing of the signal may be adjusted according to an output enable signal. Accordingly, an accurate timing control can be performed.

According to the configuration and a control method of FIG. 10, since it is possible to calculate the control signal value only by calculation without writing/reading to/from the storage device, and it is possible to further shorten the time required to obtain the control signal, making it possible to cope with vibrations with a high frequency. The subtraction method has an advantage that the control signal value can be obtained at a high speed.

As described above, according to the examples of the present invention, it is possible to obtain an effect of appropriately adjusting the damping force to prevent an excessive increase in the damping force, realizing good steering stability to improve ride comfort, and shortening time required for vehicle height adjustment.

The present invention is not limited to the above description, and various modifications and applications are possible.

For example, the damping force control unit 210 may perform the process-by-process damping force variable control when the spring 60 is fully compressed.

While the spring 60 is being compressed, the reaction force of the spring 60 is changed, making it difficult to adjust the damping force, so that when the spring 60 is fully compressed, the damping force is controlled to change, enabling accurate adjustment.

It is possible to detect that the spring 60 has reached its fully compressed state, for example, by detecting a stroke direction of the spring 60 using an acceleration sensor or the like.

The damping force control unit 210 may change a control amount of the damping force in the process-by-process damping force variable control according to the vehicle speed of the vehicle or a stroke speed of the spring.

For example, since the speed of the vehicle height increase and the ride comfort due to self-pumping are affected by the vehicle speed of the vehicle or the stroke speed of the spring, both the speed of the vehicle height increase and the ride comfort can be achieved by optimizing the control amount of the damping force in consideration of the vehicle speed and the stroke speed.

For example, when the vehicle speed rapidly increases, for example, exceeding a predetermined value or the stroke speed rapidly increases, for example, exceeding a predetermined value immediately after the start of traveling of the vehicle, since it is considered that there are many vibrations useful for self-pumping, the degree of weakening the damping force in the pushing process of the spring may be reduced.

In the above description, the motorcycle has been described as an example, but the present invention is also applicable to a three-wheeled vehicle, a four-wheeled vehicle, and the like, and the type of the vehicle is not limited.

As described above, according to the present invention, it is possible to provide the damping force variable shock absorber capable of suppressing the decrease in the speed of the vehicle height increase due to self-pumping under the influence of the damping force of the damping force generation unit.

The present invention is not limited to the examples as long as the functions and effects of the invention are exhibited.

The present invention is suitable for, for example, an electronically controlled damping force variable shock absorber capable of performing the vehicle height adjustment of a motorcycle.

The invention claimed is:

1. A damping force variable shock absorber comprising:
   a damping force variable mechanism including:
   a damping force generation unit;
   a damping force variable actuator; and
   a damping force control unit configured to control an operation of the damping force variable actuator; and
   a vehicle height control mechanism including:
   a self-pumping mechanism configured to, using a vibration caused by traveling of a vehicle provided with the damping force variable mechanism as a driving force, pressurize a hydraulic oil and push a spring;
   a vehicle height variable actuator configured to switch a flow path of the hydraulic oil pressurized by self-pumping; and
   a vehicle height control unit configured to control an operation of the vehicle height variable actuator,
   wherein the damping force control unit performs, when the spring is fully compressed, a process-by-process damping force variable control in which a damping force in a pushing process of the spring during a period in which a vehicle height is increasing by the vehicle height control mechanism is set to be weaker than a damping force in the pushing process of the spring during a period in which the vehicle height is not increasing.

2. The damping force variable shock absorber according to claim 1,
   wherein the damping force control unit and the vehicle height control unit perform respective control operations independently, in a state where there is no vehicle height increase due to self-pumping, and
   the damping force control unit and the vehicle height control unit mutually associate a damping force variable control and a vehicle height control with each other to perform a cooperative control, in a state where there is a vehicle height increase due to self-pumping.

3. The damping force variable shock absorber according to claim 1,
   wherein the damping force control unit changes a control amount of the damping force in the process-by-process damping force variable control according to a vehicle speed of the vehicle or a stroke speed of the spring.

4. The damping force variable shock absorber according to claim 1,
   wherein the damping force control unit includes:
   a calculation unit that calculates a control signal value of the damping force variable actuator; and
   an overwrite setting unit that overwrites a current control signal value with a calculated new control signal value, when the control signal value is updated in the process-by-process damping force variable control.

5. The damping force variable shock absorber according to claim 1,
   wherein the damping force control unit includes:
   a calculation unit that calculates a new control signal value by subtracting a second value, which is a constant value or a variable whose value changes according to a situation, from a first value serving as a reference, when a control signal value of the damping force variable actuator is updated in the process-by-process damping force variable control.

* * * * *